(12) United States Patent
Frazer

(10) Patent No.: US 9,867,494 B2
(45) Date of Patent: Jan. 16, 2018

(54) RECIPROCATING COFFEE FILTER

(71) Applicant: Spencer Frazer, Seattle, WA (US)

(72) Inventor: Spencer Frazer, Seattle, WA (US)

(*) Notice: Subject to any disclaimer, the term of this patent is extended or adjusted under 35 U.S.C. 154(b) by 0 days.

(21) Appl. No.: 14/335,859

(22) Filed: Jul. 18, 2014

(65) Prior Publication Data

US 2016/0206134 A1    Jul. 21, 2016

(51) Int. Cl.
*A47J 31/44* (2006.01)
*A23F 5/26* (2006.01)
*A47J 31/06* (2006.01)

(52) U.S. Cl.
CPC ............ *A47J 31/446* (2013.01); *A23F 5/262* (2013.01); *A47J 31/06* (2013.01); *A47J 31/0631* (2013.01)

(58) Field of Classification Search
CPC ...... A47J 31/446; A47J 31/06; A47J 31/0631; A23F 5/262
See application file for complete search history.

(56) References Cited

U.S. PATENT DOCUMENTS

| | | | | |
|---|---|---|---|---|
| 808,730 A * | 1/1906 | Grody | ........ | A47J 31/20 99/287 |
| 3,610,388 A * | 10/1971 | Rosenhagen | ........ | G07F 15/04 194/219 |
| 4,656,932 A * | 4/1987 | Kopp | ........ | A47J 31/06 210/474 |
| 4,779,520 A * | 10/1988 | Hauslein | ........ | A47J 31/0631 99/287 |
| 5,027,696 A * | 7/1991 | Antonini | ........ | A47J 31/20 99/279 |
| 5,112,629 A * | 5/1992 | Antonini | ........ | A47J 31/20 426/231 |
| 5,265,517 A * | 11/1993 | Gilbert | ........ | A23F 5/26 99/280 |
| 5,507,948 A * | 4/1996 | Wargo | ........ | A47J 31/446 210/479 |
| 5,957,035 A * | 9/1999 | Richter | ........ | A23F 5/26 426/433 |
| 9,499,385 B1 * | 11/2016 | Studor | ........ | B67D 3/0003 |
| 2004/0118297 A1 * | 6/2004 | Huda | ........ | A47J 31/605 99/279 |

(Continued)

FOREIGN PATENT DOCUMENTS

DE    4122547    * 1/1993
DE    29713279    * 5/1998

OTHER PUBLICATIONS

English Translation for DE29713279 published May 1998.*
English Translation for DE4122547 published Jan. 1993.*

*Primary Examiner* — Anthony Weier
(74) *Attorney, Agent, or Firm* — Forrest Law Office, P.C.

(57) ABSTRACT

A reciprocating coffee filter and method is shown. One embodiment provides a coffee maker including a housing to receive a filter basket, a coffee filter basket to receive a coffee filter, and a reciprocation assembly connected to the housing and the coffee filter basket, the reciprocation assembly to oscillate a filter basket during a brewing process. Another embodiment provides a method for filling a coffee filter within a filter basket with coffee grounds, pouring hot water on the coffee grounds to brew the coffee, and oscillating the filter basket to increase coffee ground and hot water interaction while brewing.

2 Claims, 9 Drawing Sheets

(56) References Cited

U.S. PATENT DOCUMENTS

| | | | |
|---|---|---|---|
| 2005/0223903 A1* | 10/2005 | McDaniel | A47J 31/06 99/279 |
| 2008/0202346 A1* | 8/2008 | Accumanno | A47J 31/02 99/280 |
| 2009/0004351 A1* | 1/2009 | Maurer | A47J 31/0631 426/433 |
| 2012/0318148 A1* | 12/2012 | MacDonald | A47J 31/20 99/282 |

* cited by examiner

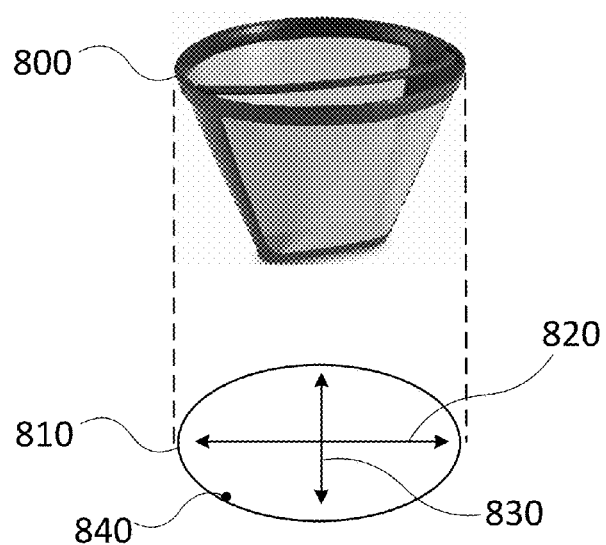
FIG. 8
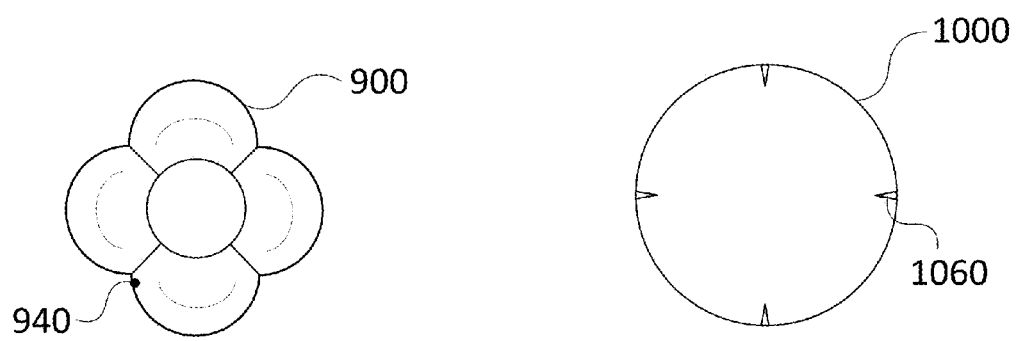
FIG. 9
FIG. 10

RECIPROCATING COFFEE FILTER

BACKGROUND

Field of the Invention

The invention relates to coffee makers, filters or filter baskets. More specifically embodiments disclosed herein relate to an apparatus and method to reciprocate or otherwise move brewing coffee during a brewing process.

Prior Art

Conventional coffee makers have a fixed relationship between a nozzle and a coffee filter or filter basket. This arrangement can cause uneven brewing of grounds in the coffee filter or filter basket, resulting in uneven extraction, incompletely brewed and over brewed grounds, etc. Some coffee makers address these considerations by rotating a coffee filter or filter basket with or without relative motion of a water dispensing nozzle over the filter or filter basket. In this way there may be a more even distribution of water over coffee grounds, but there may still be uneven extraction or brewing times similar to other conventional approaches for similar brew strength.

SUMMARY

Accordingly, a method and apparatus for a reciprocating coffee filter is described below in the Detailed Description. For example, one disclosed embodiment provides a coffee maker including a housing to receive a filter basket, a coffee filter basket to receive a coffee filter, and a reciprocation assembly connected to the housing and the coffee filter basket, the reciprocation assembly to oscillate a filter basket during a brewing process. Another example embodiment provides a method for filling a coffee filter within a filter basket with coffee grounds, pouring hot water on the coffee grounds to brew the coffee, and oscillating the filter basket to increase coffee ground and hot water interaction while brewing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an embodiment filter having an oval cross-section.

FIG. 9 shows an embodiment filter with a clover cross-section.

FIG. 10 shows an embodiment filter with internal fins.

DETAILED DESCRIPTION

Figure 1:
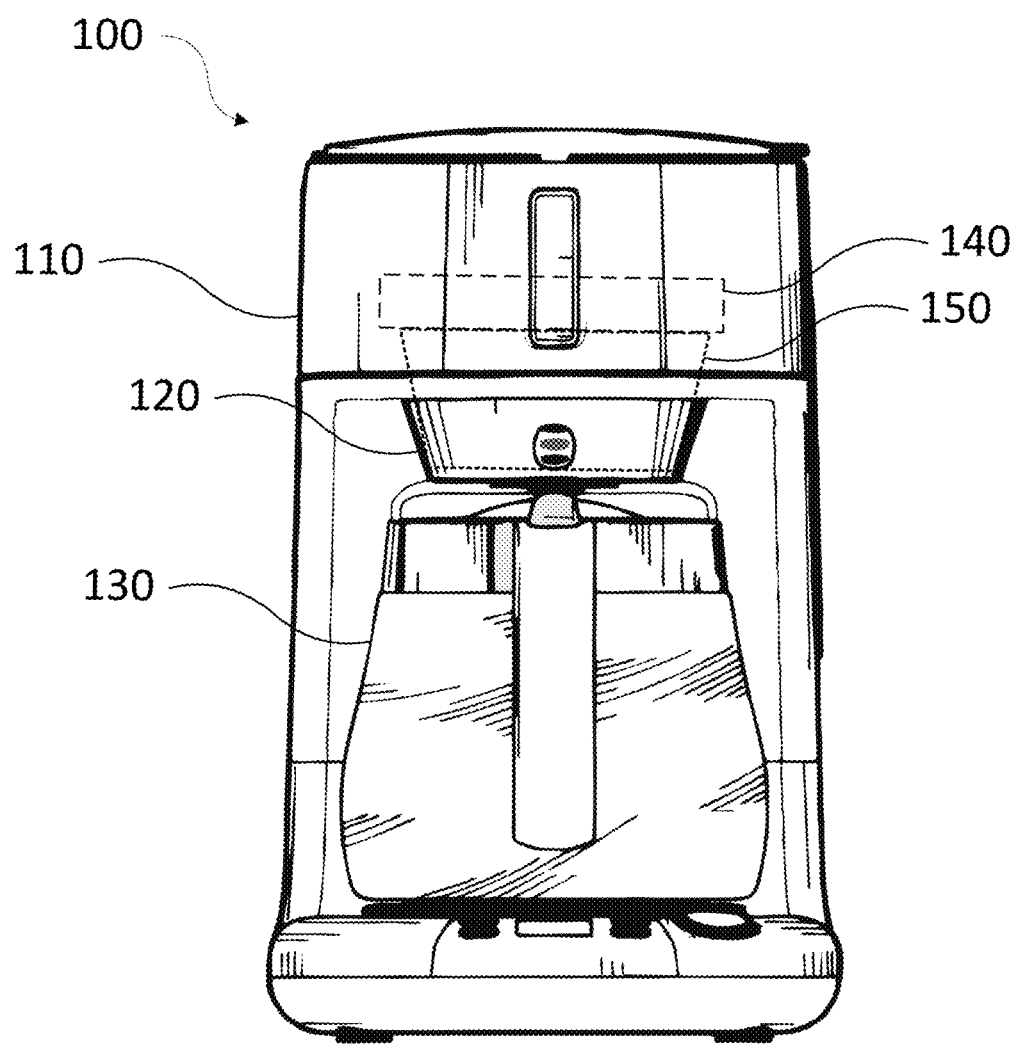
FIG. 1 shows an example embodiment coffee maker with a reciprocating filter.

FIG. 1 shows an embodiment coffee maker 100 with a reciprocating filter 150. Coffee maker 100 includes a housing 110 that receives a carafe 130, a filter basket 120 and a filter 150, and a reciprocation assembly 140. In the present embodiment, coffee maker 100 includes a reciprocation assembly 140 coupled with coffee filter 150. A reciprocation assembly may be coupled directly or indirectly to coffee filter 150 or to filter basket 120. In other embodiments, reciprocation assembly 140 may be coupled with filter basket 120, with housing 110, or with other parts of coffee maker 100 suitable to move coffee grounds during a brewing process. In this way, ground coffee in coffee filter 150 may undergo a wash motion while brewing.

While the illustrated embodiment shows a reciprocation assembly, other embodiments may use vibration, a sloshing or rocking motion, oscillation, mechanical stirring, or other relative motions between coffee grounds and water during a brewing process. Reciprocating or other similar motion of brewing coffee wets coffee in a more uniform manner, suspends the coffee grounds in the brewing water, increases surface contact between coffee grounds and water, creates a more even drainage, and creates a more uniform extraction. A reciprocating or oscillating or other motion can be accomplished with electronic servo motors, a crank and gear device, belt drive with reversing motors, an eccentric flywheel motor, and by other suitable motors, gears, linkages, electromagnetism, physical movement of magnets, etc. Additionally, various types of vibration can be used, including a slight up and down motion, a slight back and forth motion, a combination of these motions, etc. In some embodiments, an eccentric motor can be attached to a lever that bridges to the filter basket and increases this vibration. While the illustrated embodiments are discussed with reference to coffee grounds, they may be used for other food materials that may be steeped or brewed, such as tea, infusions, etc. Additionally, in some embodiments a filter may be used, a filter basket in conjunction with a filter, a filter basket that operates as a filter itself, etc. Therefore a filter may be a conventional paper filter, a filter basket itself, or other suitable filtering devices.

Figure 2:
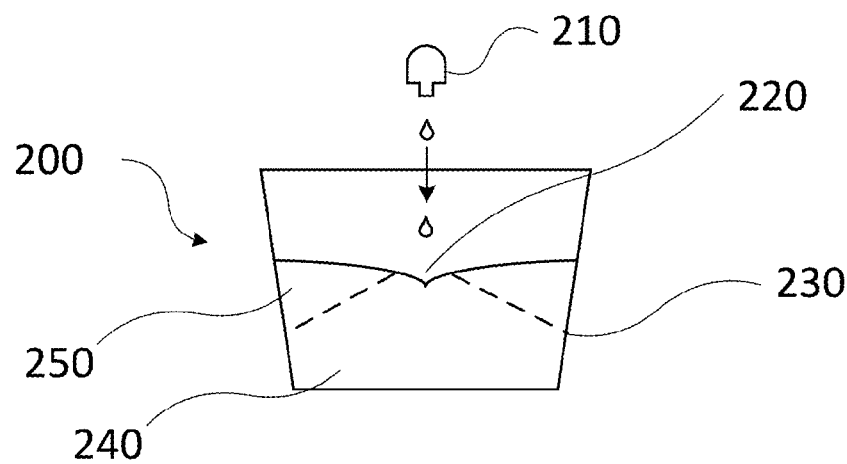
FIG. 2 shows a coffee filter and drip crater.

FIG. 2 shows a conventional coffee filter 200 and drip crater 220 caused by nozzle 210. Additionally, conventional coffee filter 200 includes flow lines 230, and an over-extracted area 240 and an under-extracted area 250 of coffee grounds. In this conventional arrangement, coffee grounds are extracted at different intensities within filter 200 and this difference is exacerbated by longer required brewing times due to filter 200 being stationary during a brewing process.

Figure 3:
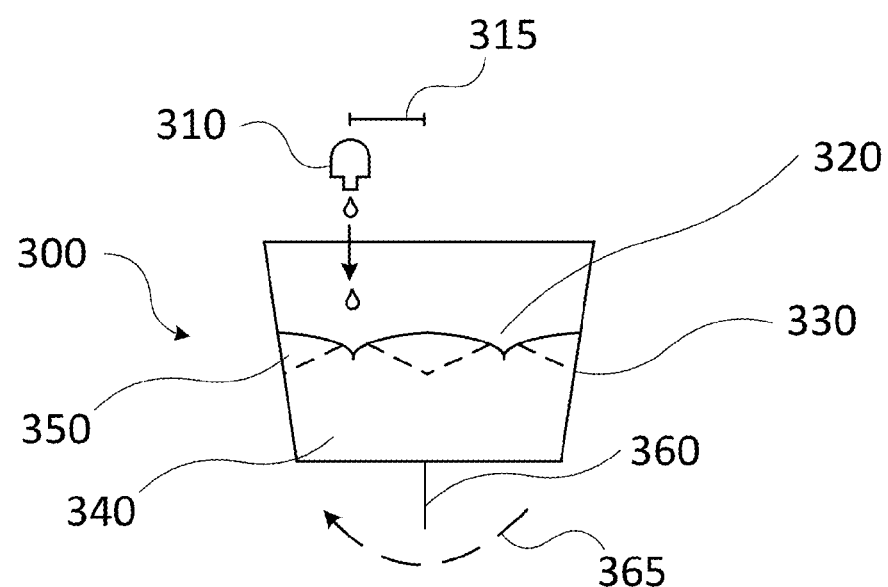
FIG. 3 shows a rotating filter with a moveable nozzle.

FIG. 3 shows a rotating filter 300 with a moveable nozzle 310. As illustrated, the coffee grounds still have a circular valley due only to rotation 365 of rotating filter 300 about an axis 360 without moving moveable nozzle 310. As moveable nozzle 310 is moved along the line 315, either toward the center of the rotating filter 300 or toward the outer wall, the top surface of the coffee grounds would become more even. However, this approach primarily improves initial rinsing of the coffee grounds but does not substantially change extraction during brewing.

With reference back to FIG. 1, coffee maker 100 may have a nozzle and filter basket 150 in a fixed position to each other, or they may have relative motion distinct from the motion caused by reciprocation assembly 140. For example, a reciprocation assembly 150 may be used in conjunction with the filter and nozzle arrangement of FIG. 2, FIG. 3, or in other arrangements.

Figure 4:
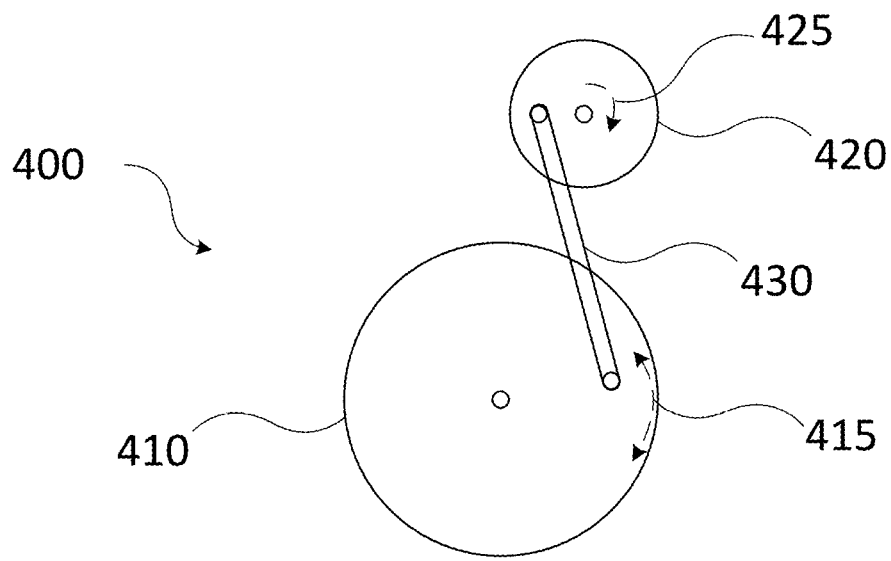
FIG. 4 shows one embodiment reciprocation assembly with a linkage arm.

FIGS. 4-7 illustrate some example embodiments of a reciprocation assembly. While these embodiments show a two wheel/gear system or concentric rings, other embodiments may use servomotors, step-motors, etc. to generate the reciprocation. With reference to FIG. 4, an embodiment reciprocation assembly 400 with a linkage arm 430 is shown. In this embodiment, a smaller wheel 420 is coupled to a larger wheel 410 by linkage arm 430, and the larger wheel is coupled to a coffee filter or filter basket. As wheel 425 rotates the linkage arm 430 will cause wheel 410 to oscillate 415 and therefore oscillate the coffee filter or filter basket. As can be seen in the illustration, wheel 420 has a smaller diameter than wheel 410. In this way, as wheel 420 rotates, the linkage arm 430 only causes wheel 410 to oscillate and does not cause a full rotation, however, other embodiments are not so limited. In some embodiments wheel 420 may also not fully rotate but may be actuated back and forth by a motor or other driver or assembly and will still cause wheel 410 to oscillate. By changing the location of linkage arm 430 on either wheel, such as by changing the relative radial distance from the axle to the linkage arm pivot point, the relative oscillation between wheel 420 and 410 can be adjusted.

Figure 5:
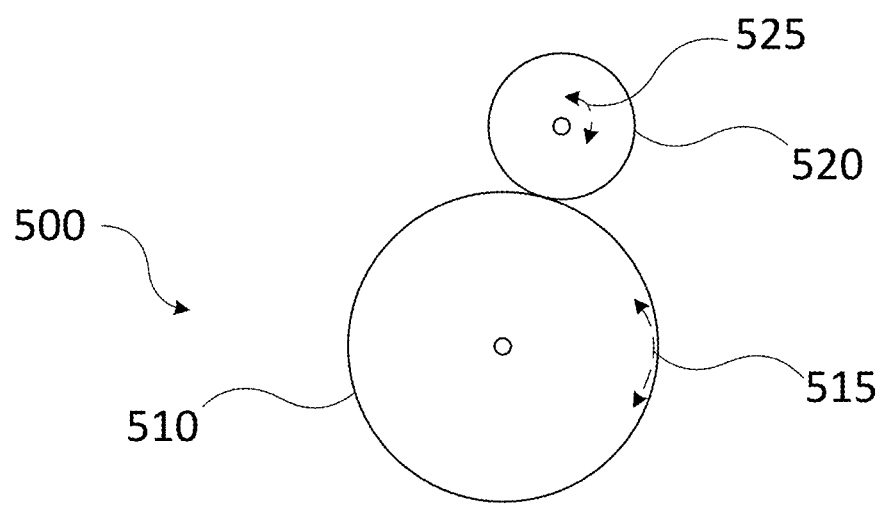
FIG. 5 shows one embodiment reciprocation assembly with coupled gears.

FIG. 5 shows one embodiment reciprocation assembly 500 with coupled gears 520 and 510. In this embodiment, wheel 520 is in contact with wheel 510, and as wheel 520 oscillates 525 it causes an oscillation 515 on wheel 510. In alternate embodiments, instead of coupled gears 520 and 510 two wheels in contact may be used. Additionally, any suitable connection between rotating elements that allows oscillation of one to be transferred to the other may be used in alternate embodiments. In similar fashion to the embodiment illustrated in FIG. 4, by changing the relative radius of gear 520 and gear 510, the transferred oscillation to wheel 510 can be adjusted to a larger or smaller oscillation.

Figure 6:
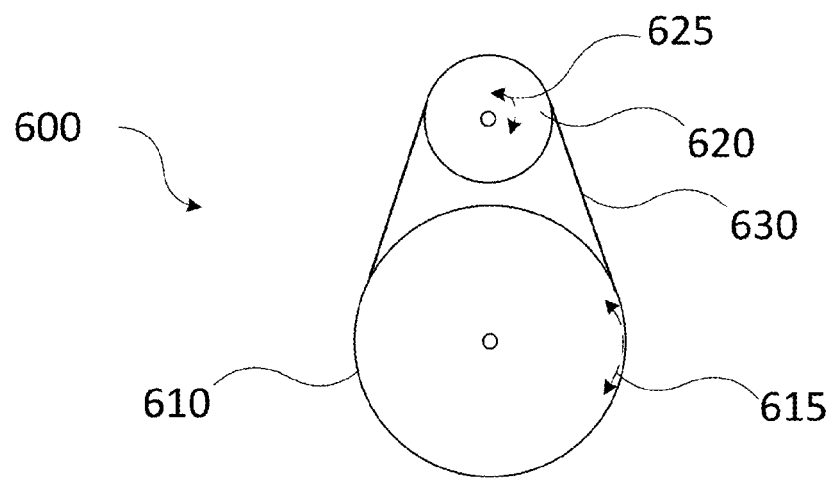
FIG. 6 shows one embodiment reciprocation assembly with two wheels connected by a belt.

With reference to FIG. 6, an embodiment reciprocation assembly 600 includes two wheels 620 and 610 connected by a belt 630. Alternate embodiments may use a chain or other similar flexible couplings. In this embodiment, as wheel 625 oscillates back and forth, the belt 630 causes wheel 610 to oscillate back and forth. The relative radius of wheel 620 to wheel 610 may be adjusted to change the resultant oscillation in wheel 610 and therefore in the coffee filter or filter basket.

Figure 7:
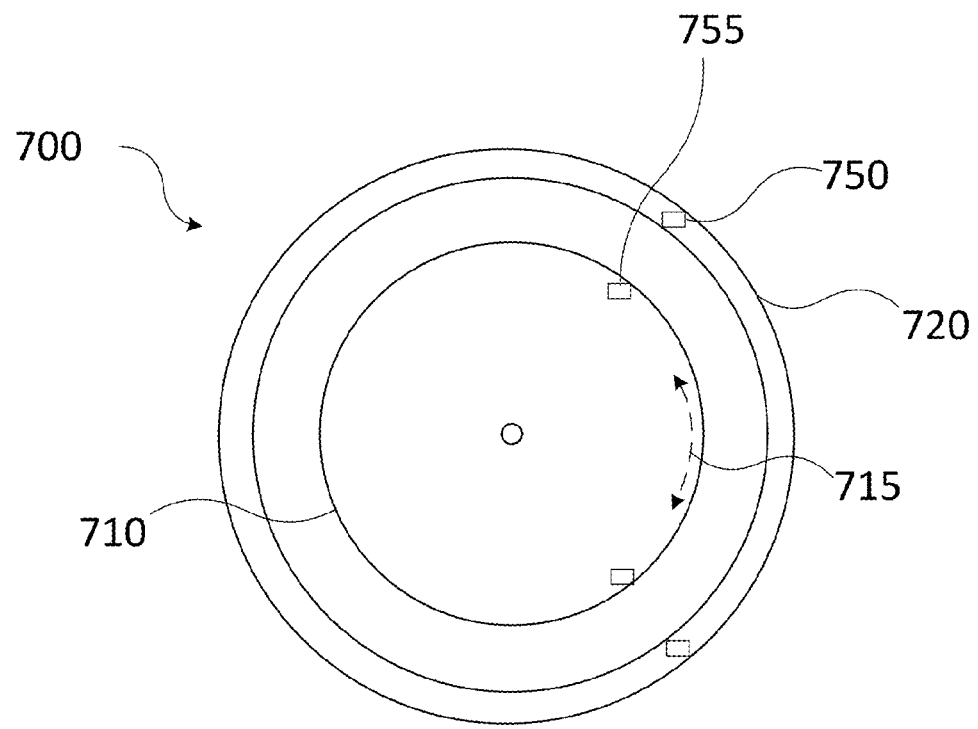
FIG. 7 shows one embodiment reciprocation assembly with a magnetic coupling.

In yet another example, as illustrated in FIG. 7 an embodiment reciprocation assembly 700 may use a magnetic coupling between a driven oscillating ring and a reciprocation assembly coupled with a coffee filter or filter basket. In the depicted embodiment, an outer ring 720 has magnet or magnetic material 750 and an inner wheel 710 has a magnet or magnetic material 755. In this arrangement, as the outer ring 720 is moved, magnetic force between the magnetic components 750 and 755 will cause inner wheel 710 to oscillate 715. In the illustration, the outer ring is shown relatively concentric with the inner wheel, but other embodiments are not so limited. For example, instead of an outer ring an adjacent wheel to inner wheel 710 may be used or even other arrangements so long as the magnetic forces can be communicated between the driven part of the assembly and the inner wheel or other structure as to allow the coffee filter or filter basket to be reciprocated. In the embodiments in FIGS. 5-6, the large wheel or the small wheel may be the wheel coupled to a filter basket or coffee filter and therefore the complementary wheel would be the drive wheel.

FIG. 8 shows an embodiment filter 800 having an oval cross-section 810 with a larger dimension 820 and a smaller dimension 830. The oval cross-section 810 of filter 800 helps transfer movement of filter 800 to coffee grounds or other material within filter 800 when the filter is oscillated. In this way, the shape promotes particle interaction, a washing motion of the coffee grounds, turbulence of the coffee grounds and water slurry, etc. Specifically, in a circular filter the oscillation path of a portion of the filter or a filter basket would be in the same path as another portion of the filter or filter basket. That is, as a circular filter rotates, it would only tend to rotate coffee grounds within the filter basket by frictional forces against the inner side of the filter. Another embodiment with a non-circular cross-section is illustrated in FIG. 9 showing a filter 900 with a clover cross-section wherein inner wall 940 would directly apply a force to any coffee grounds within the filter 900 as the filter oscillates.

In the depicted embodiment filter 800, as the oval cross-section 810 rotates in a clockwise direction, the inner wall portion 840 pushes against coffee grounds within the filter and thus induces substantially more movement of the coffee grounds within the filter. While the illustrated embodiment is substantially an oval cross-section, other shapes may be used in similar fashion. Additionally, a circular filter or filter basket may also be used, but would impart less force onto the coffee grounds within the filter or filter basket. Conventional filters or specially shaped filters or filter baskets may be used according to the embodiments disclosed herein.

In some embodiments, a filter 1000 may have internal fins 1060 such as those depicted in FIG. 10. The internal fins may be a portion of a filter basket or an integrated structure of a filter. In other embodiments, folds in a coffee filter can be used. In this way, the fins 1060 may either be used to secure a filter change a shape of a filter, or to extend into coffee grounds directly to impart forces in response to an oscillating basket.

Figure 11:
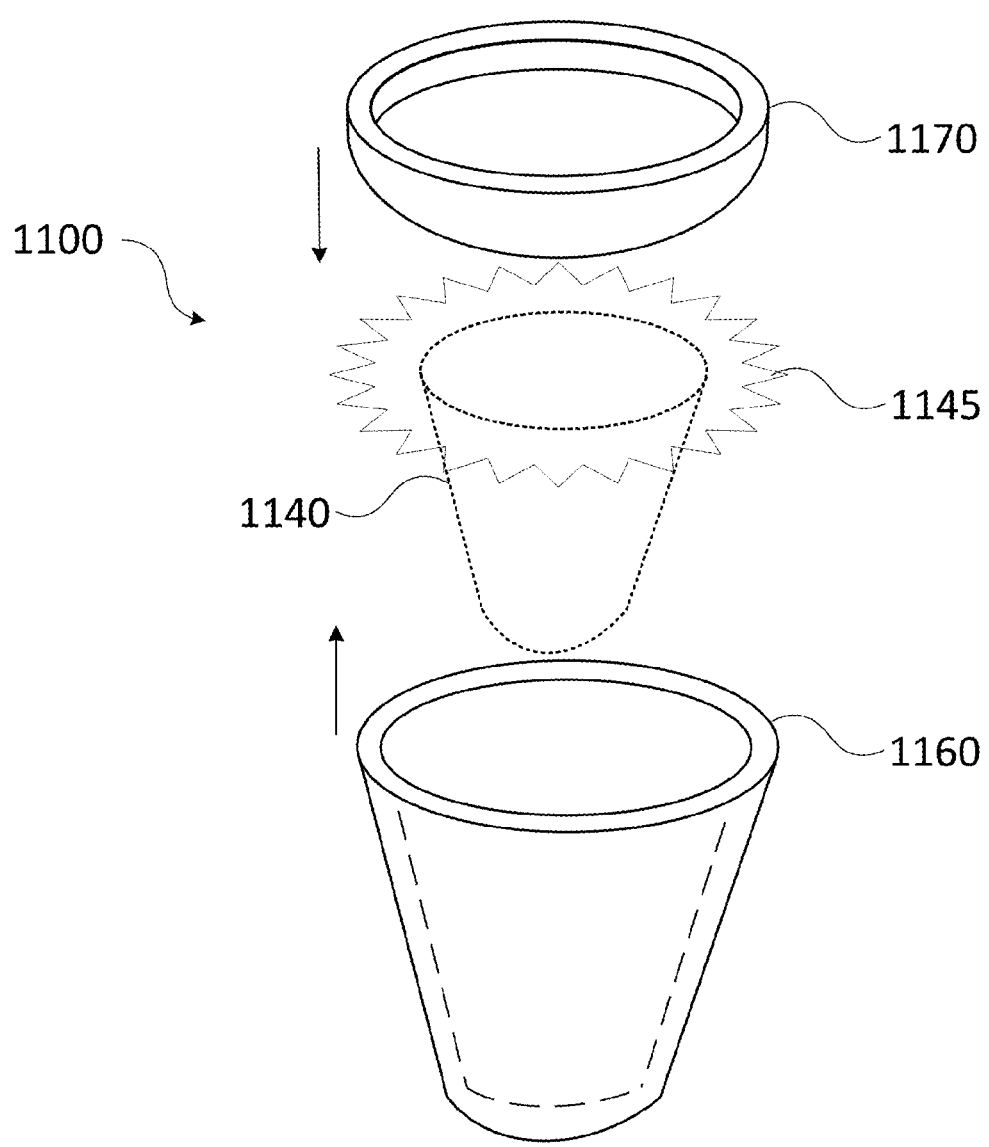
FIG. 11 shows an embodiment filter basket and ring.

FIG. 11 shows an embodiment 1100 having a filter basket 1160 and an attachment portion such as ring 1170. In this embodiment, ring 1170 can be connected to filter basket 1160 to hold a filter 1140 in place. In one example, filter 1140 may have a crown or fluted section 1145 that may be fixed between ring 1170 and filter basket 1160. Ring 1170 may be magnetically fastened to filter basket 1160, or may be threadedly engaged, have a press fitting, or may be otherwise fixedly attached to filter basket 11600. In this way, as filter basket 1160 undergoes an oscillation the force is directly applied through filter 1140 and therefore results in a greater movement of coffee grounds or other brewed or steeping matter within the filter. In the present embodiment, the top portion is ring 1170, while other non-circular shaped filter baskets may use a ring 1170 they may also use other shaped complements to ring 1170 that may still suitably attach to the filter basket to secure a filter.

Figure 12:
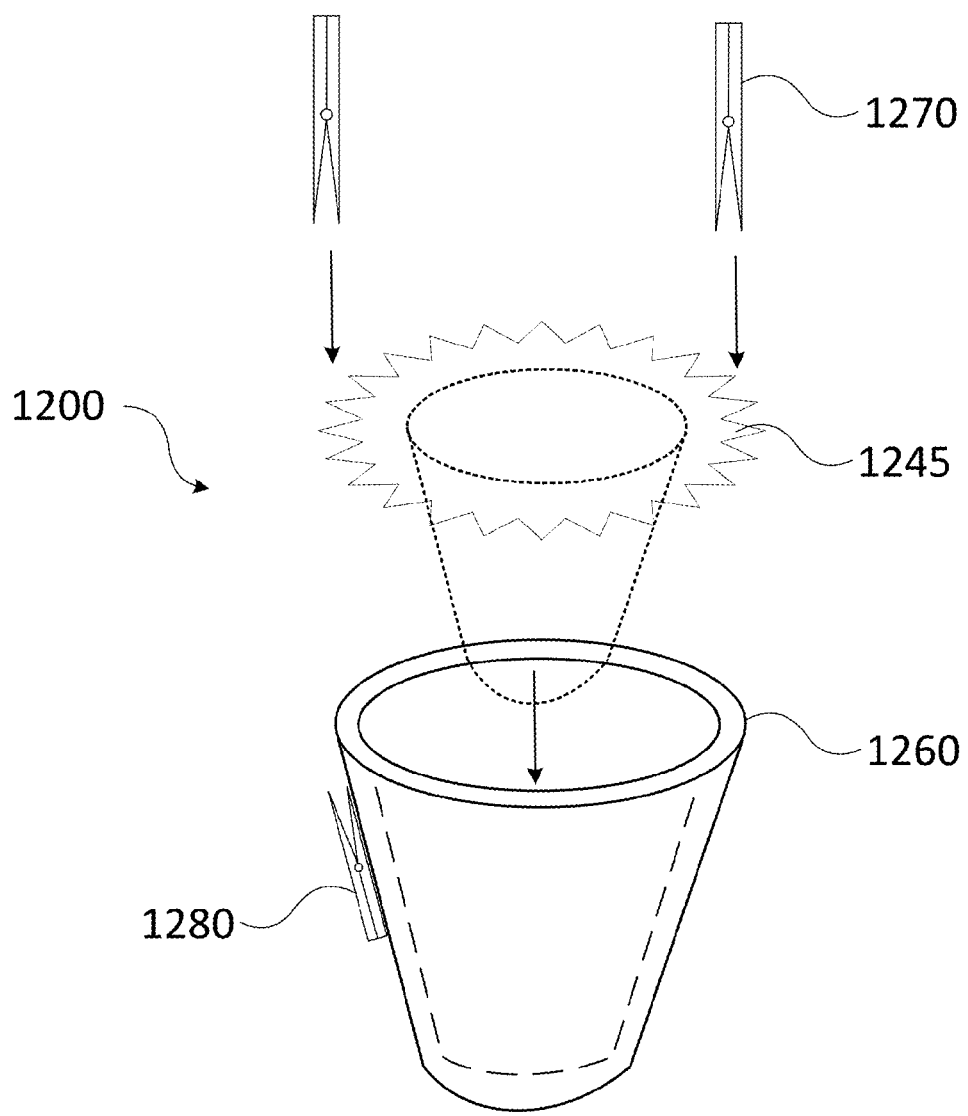
FIG. 12 shows an embodiment filter basket with filter fasteners.

FIG. 12 shows an embodiment 1200 having a filter basket 1260 with filter fasteners. In this embodiment, a filter 1245 can be coupled to filter basket 1260 with filters 1270. In this way, as filter basket 1260 undergoes an oscillation the force is directly applied through filter 1245 and therefore results in a greater movement of coffee grounds or other brewed or steeping matter within the filter. In some embodiments, fasteners may be separate from filter basket, such as fastener 1270, or may be fixed to filter basket as depicted by fastener 1280. While the illustrated embodiment shows clasping fasteners, other suitable fasteners may be used.

Figure 13:
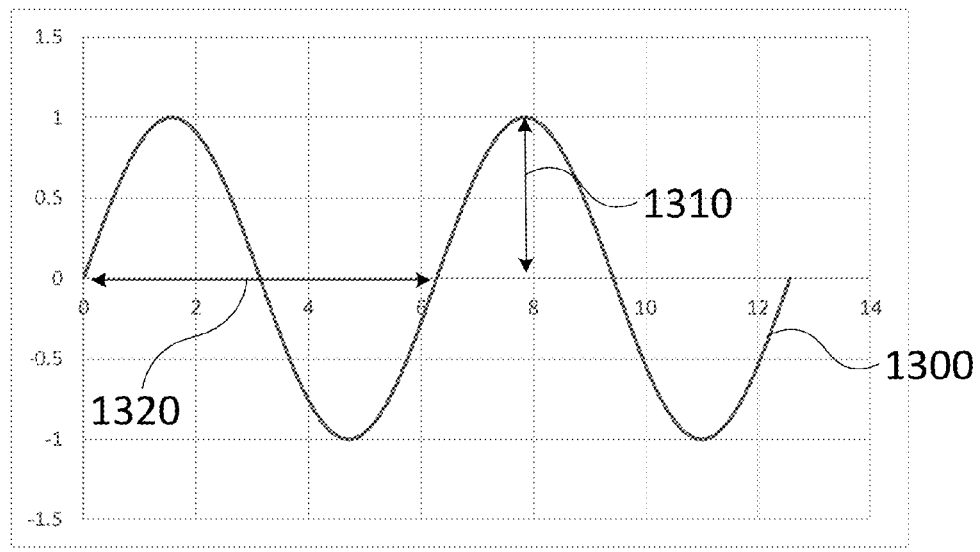
FIG. 13 shows an example sinusoidal reciprocation with adjustable amplitude and period.
Figure 14:
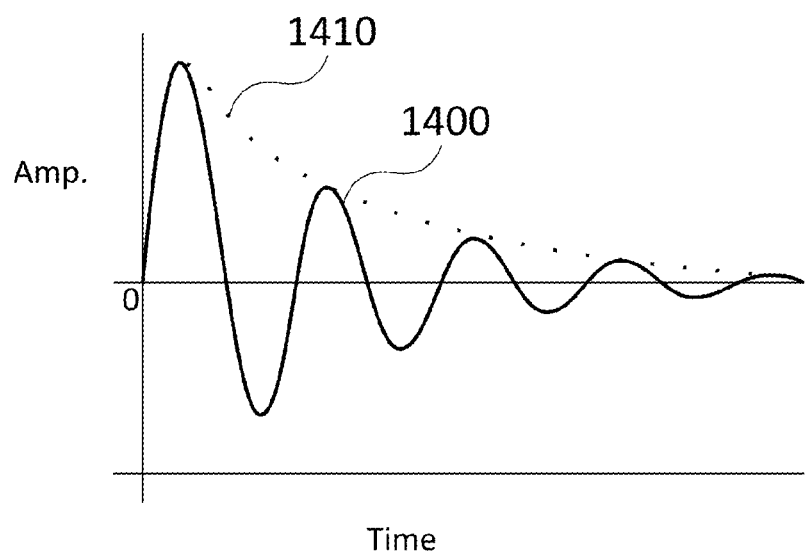
FIG. 14 shows an example sinusoidal reciprocation with an envelope program.

FIGS. 13-14 show example oscillations that embodiment filter baskets may use. A reciprocating coffee filter may be undergo a relatively uniform oscillation or the oscillations may be time varying. For example, in some embodiments a motor powering the filter basket oscillation may be controlled according to a pattern or based upon feedback from the filter basket so as to enhance a brewing process, to reduce the chances of overflow, to vary the oscillation based on stage of brewing, to help drain after brew, to compact coffee grounds prior to brewing, etc.

FIG. 13 shows an example sinusoidal reciprocation 1300 with adjustable amplitude 1310 and period 1320. In this way, the oscillation of the filter basket or coffee filter may be controlled to change in response to brewing stage, to overflow conditions, etc. In one example, as brewing begins the filter basket may have a larger amplitude and/or smaller period to cause more washing of coffee grounds and water and after the coffee grounds are brewed for a time the amplitude may be decreased or the period increased to reduce the washing motion. Other embodiments are not so limited, for example, it may be advantageous to have a greater washing motion in the middle of brewing or later in the brewing process. Or, based on the grind granularity, a set program may use a specific amplitude and period that differs from the amplitude and period used for a different grind granularity. In another example, a torque-sensing motor may detect when a filter basket is substantially full of water and coffee grounds and adjust the amplitude or period respectively to reduce overflow conditions.

FIG. 14 shows an example sinusoidal reciprocation 1400 with a boundary envelope 1410. In this example, the oscillation is adjusted according to boundary envelope 1410 to start with greater amplitude and slowly decay the amplitude. In the illustration, a decaying envelope is used, but other embodiments are not so limited. The boundary envelope may be a sinusoidal shape itself, a square wave, a triangle wave, impulses, or other programmable waveforms. In some embodiments the boundary envelope 1410 may be adjusted by a user selected brew time. For example, a user may select a quick brewing setting that increases the oscillating motion in comparison to other brew settings. Or for a more mild extraction a boundary envelope 1410 may reduce the maximum amplitude to reduce the oscillation during brewing.

Figure 15:
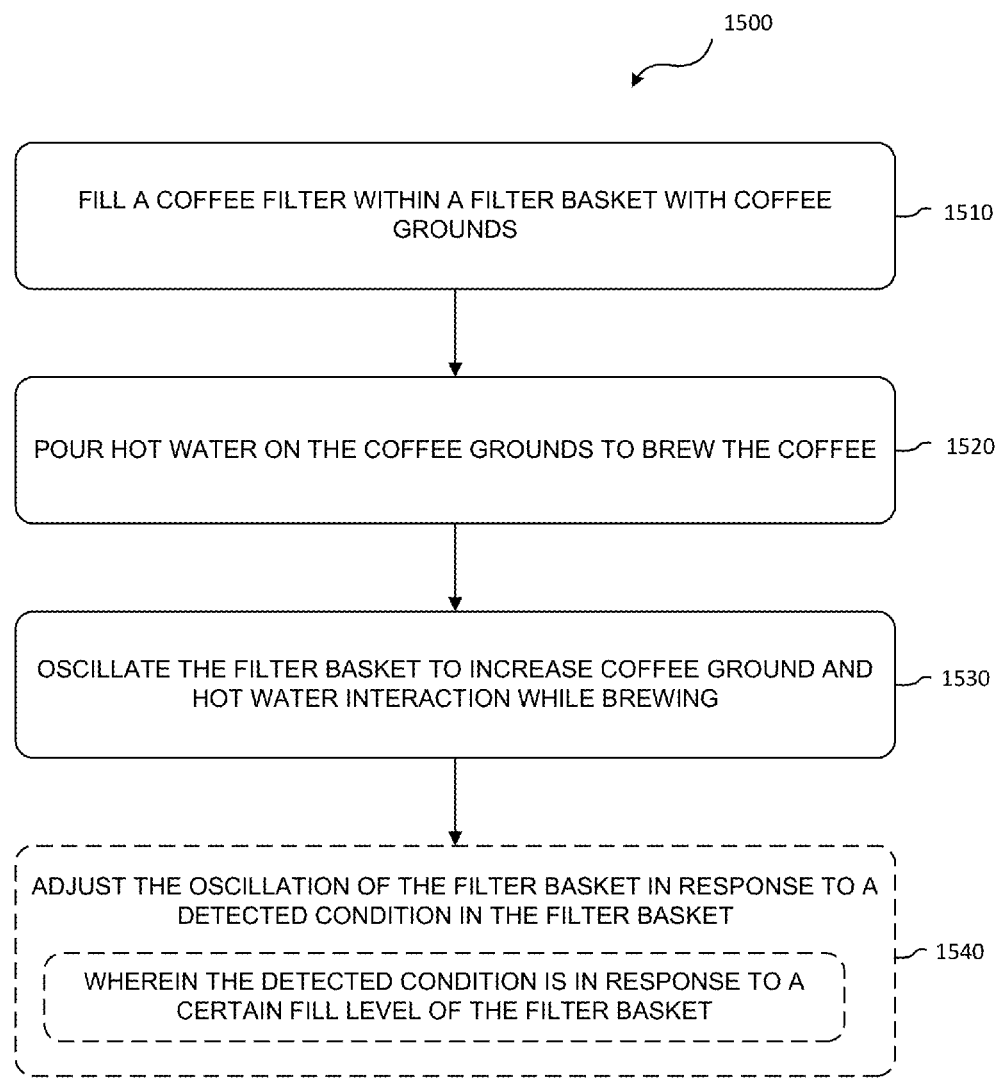
FIG. 15 is a flowchart of an example method for a reciprocating coffee filter.

FIG. 15 is a flowchart of an example method 1500 for a reciprocating coffee filter. In the illustrated method 1500, block 1510 includes filling a coffee filter within a filter basket with coffee grounds. In this embodiment, filling does not necessarily mean until the coffee filter is full, although some embodiments may have a full coffee filter. Additionally, in some embodiments a filter basket may itself be a filter. In this way, block 1510 would involve filling a coffee filter or, in the alternative, filling a filter basket. Next, in block 1520, method 1500 comprises pouring hot water on the coffee grounds to brew the coffee. However embodiments are not so limited. For example, a cold brewing process may be used and cold water or lukewarm water may be poured on the coffee grounds and the coffee can then be brewed.

In block 1510, the filter basket is then oscillated to increase coffee ground and hot water interaction while brewing. In some embodiments, the filter basket may be oscillated according to a time varying oscillation. Additionally, in some embodiments the filter basket may be oscillated within a boundary envelope. Some embodiments may further include adjusting the oscillation of the filter basket in response to a detected condition in the filter basket. For example, a detected condition may be in response to a certain fill level of the filter basket. In this way an overflow condition can be countered.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A coffee maker with a reciprocating filter, comprising:
a housing to receive a filter basket;
a filter basket to receive a coffee filter; and
a reciprocation assembly connected to the housing and the filter basket, the reciprocation assembly to oscillate the filter basket during a brewing process, wherein the reciprocation assembly includes a large wheel coupled with the filter basket and a small wheel coupled to the large wheel by a linkage arm, wherein when the small wheel rotates the large wheel oscillates, and in turn the filter basket oscillates.

2. A coffee maker with a reciprocating filter, comprising:
a housing to receive a filter basket;
a filter basket to receive a coffee filter; and
a reciprocation assembly connected to the housing and the filter basket, the reciprocation assembly to oscillate the filter basket during a brewing process wherein the reciprocation assembly includes a large wheel coupled with the filter basket and a small wheel coupled with the large wheel by a belt, wherein when the small wheel oscillates the large wheel and therefore the filter basket oscillate.

* * * * *